(12) United States Patent
Zhao et al.

(10) Patent No.: US 11,811,230 B2
(45) Date of Patent: Nov. 7, 2023

(54) CONTROL METHOD, LOAD AND POWER GRID SYSTEM

(71) Applicant: GREE ELECTRIC APPLIANCES, INC. OF ZHUHAI, Zhuhai (CN)

(72) Inventors: Zhigang Zhao, Zhuhai (CN); Yibin Tong, Zhuhai (CN); Bin Hao, Zhuhai (CN); Yuming Zhao, Zhuhai (CN); Shiyong Jiang, Zhuhai (CN); Yutong Li, Zhuhai (CN); Jinrong Yuan, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 352 days.

(21) Appl. No.: 17/284,474

(22) PCT Filed: Dec. 20, 2018

(86) PCT No.: PCT/CN2018/122316
§ 371 (c)(1),
(2) Date: Apr. 12, 2021

(87) PCT Pub. No.: WO2020/073487
PCT Pub. Date: Apr. 16, 2020

(65) Prior Publication Data
US 2021/0391720 A1    Dec. 16, 2021

(30) Foreign Application Priority Data
Oct. 12, 2018    (CN) .......................... 201811191128.5

(51) Int. Cl.
*H02J 3/12*    (2006.01)
*H02J 1/08*    (2006.01)

(52) U.S. Cl.
CPC ................ *H02J 3/12* (2013.01); *H02J 1/082* (2020.01); *H02J 2310/12* (2020.01)

(58) Field of Classification Search
CPC ........... H02J 3/12; H02J 1/082; H02J 2310/12
See application file for complete search history.

(56) References Cited

U.S. PATENT DOCUMENTS

| | | |
|---|---|---|
| 2001/0017756 A1 | 8/2001 | Iyoda |
| 2009/0102425 A1 | 4/2009 | Takahashi |

(Continued)

FOREIGN PATENT DOCUMENTS

| | | |
|---|---|---|
| CN | 101087069 A | 12/2007 |
| CN | 101378207 A | 3/2009 |

(Continued)

OTHER PUBLICATIONS

Zhejing Bao et al., "A Multi Time-Scale and Multi Energy-Type Coordinated Microgrid Scheduling Solution-Part I: Model and Methodology," in IEEE Transaction on Power Systems, Sep. 2015, vol. 30, No. 5, pp. 2257-2266.

*Primary Examiner* — Daniel Cavallari
(74) *Attorney, Agent, or Firm* — KILPATRICK TOWNSEND & STOCKTON, LLP

(57) ABSTRACT

The present disclosure relates to a control method, a load and a power grid system. The method includes: detecting (S102) a voltage change parameter on a power supply side; analyzing (S104) a load control strategy corresponding to the voltage change parameter; controlling (S106) an operation of the load according to the load control strategy. The solution solves the problem of inadequate communication facilities in the DC micro-grid, the DC home communication can be completed without or with less dedicated communication circuits, accordingly the system cost is reduced.

16 Claims, 3 Drawing Sheets

(56) References Cited

U.S. PATENT DOCUMENTS

2011/0309674 A1* 12/2011 Kamachi ................ B60L 55/00
                                                                       180/65.21
2016/0233685 A1    8/2016 Guo et al.
2019/0339519 A1* 11/2019 Toki ....................... B60K 35/00

FOREIGN PATENT DOCUMENTS

| | | |
|---|---|---|
| CN | 101412387 A | 4/2009 |
| CN | 102820768 A | 12/2012 |
| CN | 103718412 A | 4/2014 |
| CN | 104810850 A | 7/2015 |
| CN | 105610231 A | 5/2016 |
| CN | 106026165 A | 10/2016 |
| CN | 109473964 A | 3/2019 |
| DE | 102013105444 A1 | 5/2014 |

* cited by examiner

CONTROL METHOD, LOAD AND POWER GRID SYSTEM

CROSS REFERENCE TO RELATED APPLICATION

The present application is a US National Stage of International Application No. PCT/CN2018/122316, filed Dec. 20, 2018, which claims priority to Chinese Patent Application with No. 201811191128.5 and filed on Oct. 12, 2018, the content of which is expressly incorporated herein by reference in its entirety.

FIELD

The present disclosure relates to the field of communication technology, and particularly relates to a control method, a load and a power grid system.

BACKGROUND

With the rapid development of science and technology, the requirement of intelligence has become more and more common. Under the energy system architecture of direct current (DC) micro-grid (also referred to as micro-grid), a smart DC home has also entered people's perspective.

The alternating current (AC) home system under the traditional AC power grid also has endless ways to implement smart devices, such as the use of wireless communication technologies, for example, Wi-Fi, Zigbee, Bluetooth, etc., which are currently the main means for connecting the smart home systems.

SUMMARY

In one embodiment of the present disclosure, a control method is provided, which includes: obtaining (such as detecting) a voltage change parameter on a power supply side; analyzing a load control strategy corresponding to the voltage change parameter; controlling an operation of the load according to the load control strategy.

In some embodiments, the voltage change parameter includes a voltage change proportion, or a voltage change voltage difference.

In some embodiments, the detecting the voltage change parameter on the power supply side includes: detecting a current voltage on the power supply side; calculating the voltage change parameter according to the current voltage and a rated voltage.

In some embodiments, the analyzing the load control strategy corresponding to the voltage change parameter includes: determining an operation interval corresponding to the voltage change parameter, where the operation interval is divided according to different proportional values of the rated voltage or different voltage differences of the rated voltage, and one operation interval corresponds to one load control strategy; determining the load control strategy corresponding to the operation interval.

In some embodiments, the operation interval includes at least one of an adjustment area, a protection area, a normal operation area and an isolation area.

In some embodiments, the load control strategy corresponding to the adjustment area refers to adjusting of an operation parameter of a load according to the voltage change parameter.

In some embodiments, the load control strategy corresponding to the protection area refers to controlling of the load to perform protection operation.

In some embodiments, the load control strategy corresponding to the normal operation area refers to controlling of the load to operate normally without a response.

In some embodiments, the load control strategy corresponding to the isolation area refers to controlling of the load to operate normally, and simultaneously controlling of the load to enter response preparation.

In some embodiments, the protection area includes a high voltage protection area and a low voltage protection area.

In some embodiments, the high voltage protection area is greater than or equal to a first proportional value of the rated voltage, and the low voltage protection area is less than or equal to a second proportional value of the rated voltage; the adjustment area is greater than the second proportional value of the rated voltage and is less than or equal to a third proportional value of the rated voltage; the normal operation area is less than the first proportional value of the rated voltage and is greater than or equal to a fourth proportional value of the rated voltage; the isolation area is less than the fourth proportional value of the rated voltage and is greater than or equal to the third proportional value of the rated voltage; the first proportional value is greater than the fourth proportional value, the fourth proportional value is greater than the third proportional value, and the third proportional value is greater than the second proportional value.

In some embodiments, the load control strategy corresponding to the high voltage protection area refers to controlling of the load to perform high voltage protection; the load control strategy corresponding to the low voltage protection area refers to controlling of the load to perform low voltage protection.

In some embodiments, the adjustment area includes a derating area and an up-rating area; the load control strategy corresponding to the derating area refers to controlling of the operation parameter of the load to decrease and/or controlling of an operation gear of the load to decrease according to a value of the voltage change parameter; the load control strategy corresponding to the up-rating area refers to controlling the operation parameter of the load to increase and/or controlling of the operation gear of the load to increase according to the value of the voltage change parameter.

In some embodiments, the derating area is greater than the second proportional value of the rated voltage and is less than or equal to the fifth proportional value of the rated voltage; the up-rating area is greater than or equal to the fifth proportional value of the rated voltage and is less than the third proportional value of the rated voltage.

In some embodiments, the method further includes: when the operation interval of the load corresponding to the voltage change parameter is the adjustment area, after controlling the operation of the load according to the load control strategy, transmitting a control completion signal to the power supply side, and the voltage change parameter on the power supply side is adjusted to the normal operation area of the load.

In some embodiments, the method is applied to a DC home system.

In another embodiment of the present disclosure, a load is provided, which is configured to implement the above-mentioned control method.

In another embodiment of the present disclosure, a power grid system is provided, which includes the above-mentioned load and is configured to perform the above method.

In another embodiment of the present disclosure, a computer device is provided, which includes a memory, a processor, and a computer program stored on the memory and is executed on the processor, the above-mentioned control method is implemented when the processor executes the program.

In another embodiment of the present disclosure, a storage medium including computer-executable instructions is provided, the computer-executable instructions are configured to, when executed by a computer processor, perform the above-mentioned control method.

DETAILED DESCRIPTION

The exemplary embodiments will be described in detail here, and examples thereof are shown in the accompanying drawings. When the following description refers to the accompanying drawings, unless otherwise indicated, the same numbers in different drawings represent the same or similar elements. The implementation modes described in the following exemplary embodiments do not represent all implementation modes consistent with the present disclosure. Rather, these implementation modes are merely examples of a device and a method consistent with some embodiments of the present disclosure as detailed in the appended claims.

Figure 1:
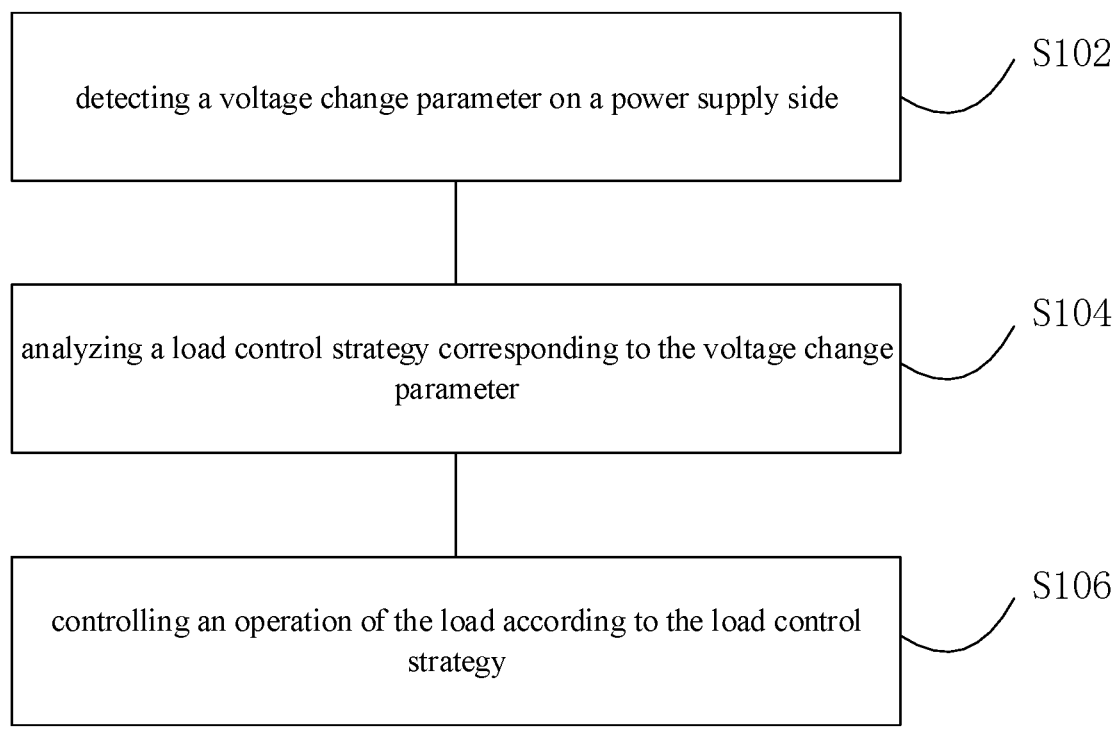
FIG. 1 is a flow chart showing a control method according to some embodiments of the present disclosure.

In some embodiments of the present disclosure, a control method is provided, which directly applied to a power grid, especially in a DC micro-grid home system. For communication based on an original line of the DC micro-grid, smart devices of the DC home communication can be completed without or with less dedicated communication circuits, accordingly the system cost is reduced, and the problem of inadequate communication facilities in the DC micro-grid can be solved. In one embodiment, FIG. 1 shows a flow chart of the method. As shown in FIG. 1, the method includes the following steps S102 to S106.

S102: a voltage change parameter on a power supply side is detected, to obtain the voltage change parameter on the power supply side.

S104: a load control strategy corresponding to the voltage change parameter is analyzed, that is, the voltage change parameter is analyzed to obtain the corresponding load control strategy.

S106: an operation of the load is controlled according to the load control strategy.

In the above some embodiments, the control method based on the voltage change is provided. The DC micro-grid source side has a voltage self-adjustment function, and the DC load side has a self-detection response function. The DC electrical load is dynamically adjusted through the change in the DC micro-grid power supply voltage, that is, communication with the load can be performed through the voltage change on the power supply side, and completing smart devices of the DC home communication without or with less dedicated communication circuits, and reducing the system cost.

In some embodiments, the step of detecting the voltage change parameter on the power supply side includes: a current voltage on the power supply side is detected; and the voltage change parameter is obtained by calculating according to the current voltage and a rated voltage. The voltage change parameter includes: a voltage change proportion, or, voltage change voltage difference.

In some embodiments, the step of analyzing the load control strategy corresponding to the voltage change parameter includes: an operation interval corresponding to the voltage change parameter is determined; the operation interval is divided according to different proportional values of the rated voltage or different voltage differences from the rated voltage, one operation interval corresponds to one load control strategy; and the corresponding load control strategy is determined according to the operation interval.

Figure 2:
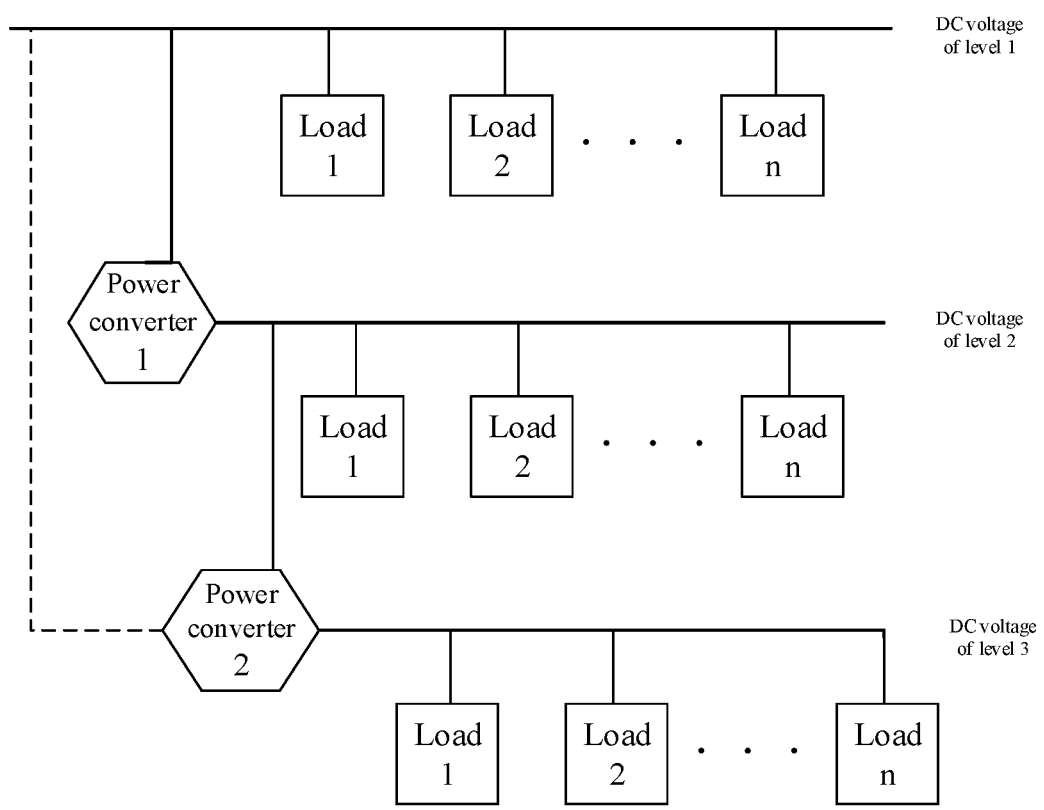
FIG. 2 is a schematic diagram illustrating a DC voltage level division according to some embodiments of the present disclosure.

In the above some embodiment, the voltage change parameter on the power supply side is actively adjusted. On the load side, the DC electrical load is dynamically adjusted by detecting the voltage change, that is, the communication with the load is performed through the voltage change on the power supply side. In one embodiment, the voltage self-adjustment function on the power supply side can implement multi-level voltage adjustment. As shown in FIG. 2, a power supply bus with multiple DC voltage levels is included (for example, a DC voltage of level 1, a DC voltage of level 2, and a DC voltage of level 3 are included).

For example, in some embodiments the home DC distribution voltage is set as: the DC voltage level equals to 1, 400 VDC or other recommended values is selected, on the DC power supply bus of the DC voltage of level 1, the voltage change parameter on the power supply side is the first voltage proportion or the first voltage difference; this moment, the load (load 1, load 2, . . . , load n, where n may be 1) on the line executes the control strategy corresponding to the first voltage proportion or the first voltage difference.

A power converter 1 is connected to the DC power supply bus of the DC voltage level 1, and the distribution voltage is converted to a DC voltage of level 2. The DC voltage of level 2 can be 375 VDC or other recommended values. On the DC power supply bus of the DC voltage of level 2, the voltage change parameter on the power supply side is the second voltage proportion or the second voltage difference. This moment, the load on the line (load 1, load 2, . . . , load n, where n can be 1) execute the control strategy corresponding to the second voltage proportion or the second voltage difference. The same is applied to a DC voltage of level 3.

It should be noted that in this example, a three-level power supply line is used as an example. In actual implementation, two-level, four-level, or more-level power supply line can also be used, which is not limited here, and which can be set according to actual requirements.

During implementation, multiple levels of DC voltages can be set, and different voltage values can be defined for different levels of DC voltages. Further, in order to control the power supply system, not only the number of access devices is considered, but also different control strategies can be adopted for different types of load devices.

In some embodiments, the operation interval includes at least one of an adjustment area, a protection area, a normal operation area, and an isolation area. The load control strategy corresponding to the adjustment area refers to adjusting of an operation parameter of the load according to the voltage change parameter. The load control strategy corresponding to the protection area refers to controlling the protection operation of the load. The load control strategy corresponding to the normal operation area refers to controlling of the normal operation of the load, and no response is required. The load control strategy corresponding to the isolation area refers to controlling of the normal operation of the load and meanwhile control the load to enter the response preparation.

The protection area includes a high voltage protection area and a low-voltage protection area. The high voltage protection area is greater than or equal to a first proportional value of the rated voltage, and the low-voltage protection area is less than or equal to a second proportional value of the rated voltage. The adjustment area is greater than or equal to the second proportional value of the rated voltage and is less than or equal to a third proportional value of the rated voltage. The normal operation area is less than the first proportional value of the rated voltage and is greater than or equal to a fourth proportional value of the rated voltage. The isolation area is less than the fourth proportional value of the rated voltage and is greater than or equal to the third proportional value of the rated voltage. The first proportional value is greater than the fourth proportional value, the fourth proportional value is greater than the third proportional value, and the third proportional value is greater than the second proportional value.

In the above embodiment, the load control strategy corresponding to the high voltage protection area refers to controlling of the load for high voltage protection; the load control strategy corresponding to the low voltage protection area refers to controlling of the load for low voltage protection.

In some embodiments, the adjustment area includes a derating area and an up-rating area. The derating area is an area in which the operation parameters or gears or other adjustable portions of the load are reduced, and the up-rating area is an area in which the operation parameters or gears or other adjustable portions of the load are increased. In one embodiment, the load control strategy corresponding to the derating area refers to controlling of the operation parameter of the load to decrease, and/or controlling of the operation gear of the load to decrease according to the value of the voltage change parameter. The load control strategy corresponding to the up-rating area refers to controlling of the operation parameter of the load to increase, and/or controlling of the operation gear of the load to increase according to the value of the voltage change parameter. The derating area is greater than the second proportional value of the rated voltage and is less than or equal to a fifth proportional value of the rated voltage. The up-rating area is greater than or equal to the fifth proportional value of the rated voltage and is less than the third proportional value of the rated voltage.

In the present disclosure, the communication between the source side and the load is established based on the DC micro-grid power supply AU (voltage change), and the load can parse the situation of the source side through the dynamic power supply voltage value, to respond to the load side.

In some embodiments, when the operation interval of the load corresponding to the voltage change parameter is the adjustment area, after the operation of the load is controlled according to the control strategy, the method further includes: a control completion signal is transmitted to the power supply side, so that the voltage change parameter on the power supply side is adjusted to the normal operation area of the load.

The change in the power supply voltage of the DC home system under the DC micro-grid is utilized to form an intelligent response control to the DC electrical device to implement functions such as voltage adjustment and power adjustment. In addition to actively using the voltage change to adjust the load, the present disclosure can also cope with the impact of voltage fluctuations of the power supply side on the load, and avoid load-side faults caused by the larger voltage fluctuations of the power supply side.

Figure 3:
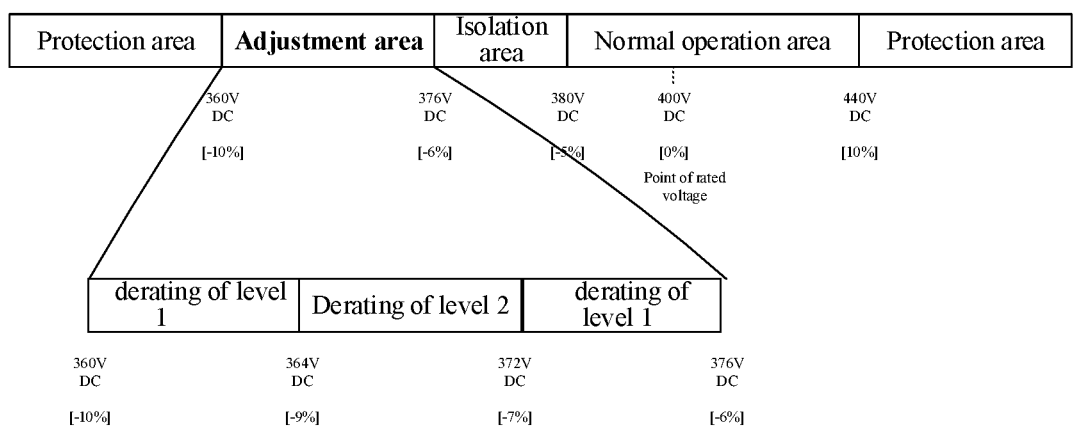
FIG. 3 is a schematic diagram illustrating an operation interval corresponding to a voltage change parameter according to some embodiments of the present disclosure.

In some embodiments, another control method is further provided. In this control method, for the source side of the DC micro-grid, the allowable operation range is within −10% to 10% of the rated voltage according to the requirements, or the user can set the allowable operation range according to the requirement on the DC load side. As shown in FIG. 3, the 400V DC power supply of the DC micro-grid is used as the rated voltage, and the voltage value of the source side is divided into low voltage protection area, bandwidth signal area, isolation area, normal operation area, protection area, etc. When the voltage sags or is lower than −10% of the rated voltage, that is, when 360V DC, the DC load side responds, the low voltage protection action is performed. When the voltage falls within −10% to −6% of the rated voltage, that is, 360V to 376V DC, the DC load side responds, a communication interaction is performed, the DC load power or switch is limited according to different voltage differences. When the voltage falls within −6% to −5% of the rated voltage, that is, 376V to 380V DC, the DC load operates normally and enters the response preparation at the same time, which is also redundant or anti-interference design, to avoid DC load mis-protection or other abnormalities such as frequent voltage jumps in the adjustment area and normal operation area, which may affect the use. When the voltage is between −5% to 10% of the rated voltage, that is, between 380V to 440V DC, the DC load operates normally and does not respond. When the voltage changes suddenly or is higher than 10% of the rated voltage, that is, 440V DC, the DC load responds, and a high voltage protection action is performed.

In the bandwidth signal communication area, as shown in FIG. 3, a fine definition can be provided as follows. When the voltage falls within a range of −10% to −9% of the rated voltage, that is, 360V to 364V DC, the power for the operation is limited to 70% on the DC load side. When the voltage falls within a range of −9% to −7% of the rated voltage, that is, 364V to 372V DC, the power for the operation is limited to 50% on the DC load side. When the voltage falls within a range of −7% to −6% of the rated voltage, that is, 372V to 376V DC, the power for the operation is limited to 30% on the DC load side. It is ensured that the voltage should not continue to drop caused by a high load operation, and the power supply circuit should not have an excessive loss and heat due to a high current.

In an area greater than the rated voltage, the communication can also be partitioned for real-time response. For example, when the voltage falls within a range of 6% to 10% of the rated voltage, the DC load side operates to increase the power to adapt to the voltage change.

At the same time, in addition to changes in the power, changes in other parameters can also be adjusted, such as the voltage, current, etc. In addition, the adjustment of the load can also be the adjustment of the load control gear. An air conditioner is taken as an example, the temperature of the air conditioner can be adjusted to increase or decrease, and the gear of a fan can be adjusted to increase and then decrease according to the voltage change in the adjustment area. At the same time, a response mode such as a switch can be provided.

In the above some embodiments, the division of the voltage values on the source side is set according to 1% or other resolutions. Under a high precision DC micro-grid power supply voltage, the smaller the resolution, the more information is communicated.

The active voltage adjustment function can also be added to the DC micro-grid source side to form a communication mode without master station (in the above mode, the source side is the master and the load side is the slave). The source side can complete the voltage adjustment according to requirements of the power on the DC load side, to achieve an optimal efficiency and an optimal line loss.

In some embodiments of the present disclosure, a load is further provided, and the load is configured to implement the control method as in any of the above-mentioned embodiments. In some embodiment, the control method as in any of the above-mentioned some embodiments is implemented by one unit, and the unit is in the load or electrically connected to the load.

In the above some embodiments, a communication mode based on the voltage change is provided. The DC micro-grid source side has a voltage self-adjustment function, and the DC load side has a self-detection response function. The DC electrical load is dynamically adjusted through the change in the DC micro-grid power supply voltage, that is, the communication with the load is performed through the voltage change on the power supply side, and completing smart devices of DC home communication without or with less dedicated communication circuits, and reducing the system cost.

In some embodiments of the present disclosure, a power grid system is further provided, which is configured to perform the above-mentioned method. The system includes: a power source side, configured to send a corresponding load control strategy to a load side through a voltage change parameter; a load side, configured to detect the voltage change parameter on the power supply side, analyze the load control strategy corresponding to the voltage change parameter, and operate according to the control strategy.

In the above some embodiments, a communication mode based on a voltage change is provided. The DC micro-grid source side has a voltage self-adjustment function, and the DC load side has a self-detection response function. The DC electrical load is dynamically adjusted through the change in the DC micro-grid power supply voltage, that is, a communication with the load side is performed through the voltage change on the power supply side, and completing smart devices of DC home communication without or with less dedicated communication circuits, and reducing the system cost.

In some embodiments of the present disclosure, a computer device is further provided, which includes a memory, a processor, and computer programs stored in the memory and is executed on the processor, and the above-mentioned control method is implemented when the processor executes the computer programs.

In the above some embodiments, a communication mode based on a voltage change is provided. The DC micro-grid source side has a voltage self-adjustment function, and the DC load side has a self-detection response function. The DC electrical load is dynamically adjusted through the change in the DC micro-grid power supply voltage, that is, the communication with the load side is performed through the voltage change on the power supply side, and completing smart devices of DC home communication without or with less dedicated communication circuits, and reducing the system cost.

In some embodiments of the present disclosure, a storage medium including computer-executable instructions is further provided. The computer-executable instructions are configured to, when executed by a computer processor, perform the above-mentioned control method.

In the above some embodiment, a control method based on a voltage change is provided. The DC micro-grid source side has a voltage self-adjustment function, and the DC load side has a self-detection response function. The DC electrical load is dynamically adjusted through the change in the DC micro-grid power supply voltage, that is, the communication with the load side is performed through the voltage change on the power supply side, and completing smart devices of DC home communication without or with less dedicated communication circuits, and reducing the system cost.

Other embodiments of the present disclosure after considering the specification and practicing the present disclosure. The disclosure is intended to cover any variations, uses, or adaptive changes of the present disclosure. These variations, uses, or adaptive changes follow the general principles of the present disclosure and include common knowledge or means in the field not disclosed in the present disclosure. The description and the embodiments are merely regarded as exemplary, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A control method, comprising:
   obtaining a voltage change parameter on a power supply side;
   analyzing a load control strategy corresponding to the voltage change parameter; and
   controlling an operation of the load according to the load control strategy,
   wherein the analyzing the load control strategy corresponding to the voltage change parameter comprises:
   determining an operation interval corresponding to the voltage change parameter, wherein the operation interval is divided according to different proportional values of the rated voltage or different voltage differences of the rated voltage, and one operation interval corresponds to one load control strategy; and
   determining the load control strategy corresponding to the operation interval.

2. The method according to claim 1, wherein the obtaining the voltage change parameter on the power supply side comprises:
   detecting a present voltage on the power supply side; and
   calculating the voltage change parameter according to the present voltage and a rated voltage.

3. The method according to claim 1, wherein the operation interval comprises:
   an adjustment area, wherein a load control strategy corresponding to the adjustment area refers to adjusting of an operation parameter of a load according to the voltage change parameter.

4. The method according to claim 3, wherein the operation interval further comprises at least one of a protection area, a normal operation area, and an isolation area; wherein,
a load control strategy corresponding to the protection area refers to controlling of the load to perform protection operation;
a load control strategy corresponding to the normal operation area refers to controlling of the load to operate normally; and
a load control strategy corresponding to the isolation area refers to controlling of the load to operate normally, and simultaneously controlling of the load to enter response preparation.

5. The method according to claim 4, wherein,
the protection area comprises a high voltage protection area and a low voltage protection area; the high voltage protection area is greater than or equal to a first proportional value of the rated voltage, and the low voltage protection area is less than or equal to a second proportional value of the rated voltage;
the adjustment area is greater than the second proportional value of the rated voltage and is less than or equal to a third proportional value of the rated voltage;
the normal operation area is less than the first proportional value of the rated voltage and is greater than or equal to a fourth proportional value of the rated voltage;
the isolation area is less than the fourth proportional value of the rated voltage and is greater than or equal to the third proportional value of the rated voltage; and
wherein the first proportional value is greater than the fourth proportional value, the fourth proportional value is greater than the third proportional value, and the third proportional value is greater than the second proportional value.

6. The method according to claim 4, wherein the protection area comprises a high voltage protection area and a low voltage protection area;
a load control strategy corresponding to the high voltage protection area refers to controlling of the load to perform high voltage protection; and
a load control strategy corresponding to the low voltage protection area refers to controlling of the load to perform low voltage protection.

7. The method according to claim 3, wherein the adjustment area comprises a derating area and an up-rating area;
a load control strategy corresponding to the derating area refers to controlling of the operation parameter of the load to decrease and/or controlling of an operation gear of the load to decrease according to a value of the voltage change parameter; and
a load control strategy corresponding to the up-rating area refers to controlling of the operation parameter of the load to increase and/or controlling of the operation gear of the load to increase according to the value of the voltage change parameter.

8. The method according to claim 5, wherein the adjustment area comprises a derating area and an up-rating area;
a load control strategy corresponding to the derating area refers to controlling of the operation parameter of the load to decrease and/or controlling of an operation gear of the load to decrease according to a value of the voltage change parameter;
a load control strategy corresponding to the up-rating area refers to controlling of the operation parameter of the load to increase and/or controlling of the operation gear of the load to increase according to the value of the voltage change parameter;
the derating area is greater than the second proportional value of the rated voltage and is less than or equal to a fifth proportional value of the rated voltage; and
the up-rating area is greater than or equal to the fifth proportional value of the rated voltage and is less than the third proportional value of the rated voltage.

9. The method according to claim 3, further comprising:
when the operation interval of the load corresponding to the voltage change parameter is the adjustment area, after controlling the operation of the load according to the load control strategy,
transmitting a control completion signal to the power supply side, wherein the voltage change parameter on the power supply side is adjusted to the normal operation area of the load.

10. The method according to claim 1, wherein the method is applied to a DC home system.

11. The method according to claim 1, wherein the voltage change parameter comprises: a voltage change proportion, or a voltage change voltage difference.

12. A load, configured to implement the control method of claim 1.

13. A power grid system, comprising the load of claim 12.

14. A computer device, comprising a memory, a processor, and a computer program stored on the memory and is executed on the processor, wherein the control method of claim 1 is implemented when the processor executes the program.

15. A nonvolatile storage medium comprising computer-executable instructions, wherein the computer-executable instructions are configured to, when executed by a computer processor, perform the control method of claim 1.

16. The method according to claim 5, wherein a load control strategy corresponding to the high voltage protection area refers to controlling of the load to perform high voltage protection; and
wherein a load control strategy corresponding to the low voltage protection area refers to controlling of the load to perform low voltage protection.

* * * * *